(12) United States Patent
Kumar et al.

(10) Patent No.: US 11,105,993 B2
(45) Date of Patent: Aug. 31, 2021

(54) DIRECT BURIAL SENSORY CABLE

(71) Applicant: Sterlite Technologies Limited, Maharashtra (IN)

(72) Inventors: Sravan Kumar, Maharashtra (IN); Dnyaneshwar Wagh, Maharashtra (IN); Kishore Sahoo, Maharashtra (IN); Atul Mishra, Maharashtra (IN); Vikas Shukla, Maharashtra (IN)

(73) Assignee: STERLiTE TEchNologiES LimiTED, Aurangabad (IN)

( * ) Notice: Subject to any disclaimer, the term of this patent is extended or adjusted under 35 U.S.C. 154(b) by 0 days.

(21) Appl. No.: 16/262,892

(22) Filed: Jan. 30, 2019

(65) Prior Publication Data
US 2020/0183115 A1    Jun. 11, 2020

(30) Foreign Application Priority Data
Dec. 6, 2018 (IN) .............................. 201821046211

(51) Int. Cl.
*G02B 6/44* (2006.01)
*G01D 5/26* (2006.01)

(52) U.S. Cl.
CPC ........... *G02B 6/4434* (2013.01); *G01D 5/264* (2013.01); *G02B 6/4432* (2013.01); *G02B 6/4495* (2013.01)

(58) Field of Classification Search
None
See application file for complete search history.

(56) References Cited

U.S. PATENT DOCUMENTS

| | | | | |
|---|---|---|---|---|
| 5,751,880 A * | 5/1998 | Gaillard | ............... | G02B 6/4413 385/103 |
| 7,570,852 B2 * | 8/2009 | Nothofer | ............... | G02B 6/4438 385/100 |
| 9,989,723 B2 * | 6/2018 | Hoshino | ............... | G02B 6/448 |
| 2008/0056651 A1 * | 3/2008 | Nothofer | ............... | G02B 6/4436 385/109 |
| 2012/0281953 A1 * | 11/2012 | Choi | ............... | G02B 6/441 385/101 |
| 2018/0231729 A1 * | 8/2018 | Baetz | ............... | G02B 6/4435 |
| 2018/0252884 A1 * | 9/2018 | Quinn | ............... | G02B 6/4413 |
| 2020/0183115 A1 * | 6/2020 | Kumar | ............... | G02B 6/4434 |

\* cited by examiner

*Primary Examiner* — Tina M Wong

(57) ABSTRACT

The present disclosure provides a sensory cable (100). The sensory cable (100) includes a central strength member (106). In addition, the sensory cable (100) includes a first layer (108). The first layer (108) surrounds the central strength member (106). The first layer (108) is made of low smoke zero halogen. Further, the sensory cable (100) includes a plurality of optical units (110). Furthermore, the sensory cable (100) includes a second layer (112). The second layer (112) is made of a plurality of glass yarns. Moreover, the sensory cable (100) includes a first jacket layer (114). The first jacket layer (114) is made of either polyethylene or polypropylene. Also, the sensory cable (100) includes a second jacket layer (116). The second jacket layer (116) is made of nylon.

13 Claims, 2 Drawing Sheets

DIRECT BURIAL SENSORY CABLE

TECHNICAL FIELD

The present disclosure relates to the field of optical fiber cable and, in particular, relates to a sensory cable for direct buried application.

BACKGROUND

Over the last few years, optical fiber cables have been increasingly employed for various industrial applications. One such type of optical fiber cable is sensory optical fiber cables which are used for sensing and buried applications. These sensory cables include tight buffered optical fibers for sensing applications. Typically, the sensory optical fiber cables have a large cable diameter which affects the blowing performance and bending performance of the cable. Also, the currently available sensory optical fiber cable does not have high sensing applications when buried at a certain distance below the ground level.

In light of the foregoing discussion, there exists a need for a sensory optical fiber cable which overcomes the above cited drawbacks of conventionally known sensory optical fiber cables.

OBJECT OF THE DISCLOSURE

A primary object of the present disclosure is to provide a sensory cable having small diameter.

Another object of the present disclosure is to provide the sensory cable with high bending performance.

Yet another object of the present disclosure is to provide the sensory cable that provides anti-rodent and anti-termite properties.

Yet another object of the present disclosure is to provide the sensory cable having high pulling strength.

Yet another object of the present disclosure is to provide the sensory cable that is highly sensitive to external stress.

Yet another object of the present disclosure is to provide the sensory cable having high flexibility.

SUMMARY

In an aspect, the present disclosure provides a sensory cable for direct buried application. The sensory cable includes a central strength member lying substantially along a longitudinal axis passing through a geometrical center of the sensory cable. In addition, the sensory cable includes a first layer surrounds the central strength member. The first layer is made of low smoke zero halogen. Further, the sensory cable includes a plurality of optical units. The plurality of optical units is embedded in the first layer. The plurality of optical units is positioned along a longitudinal length of the first layer. Furthermore, the sensory cable includes a second layer. The second layer surrounds the first layer. In addition, the second layer is made of a plurality of glass yarns. Moreover, the sensory cable includes a first jacket layer. The first jacket layer surrounds the second layer. Also, the sensory cable includes a second jacket layer. The second jacket layer surrounds the first jacket layer. The sensory cable is a high sensitive cable and enabled to be buried at a depth of up to 5 meters.

In an embodiment of the present disclosure, the sensory cable includes a plurality of ripcords. The plurality of ripcords is positioned diametrically opposite around the central strength member.

In an embodiment of the present disclosure, the plurality of optical units is a plurality of tight buffered fibers embedded inside the first layer. Each of the plurality of tight buffered fibers has a diameter in a range of about 0.9 millimeter±0.1 millimeter. In addition, number of the plurality of tight buffered fibers is either 6 or 12.

In an embodiment of the present disclosure, the plurality of optical units is a plurality of loose tubes embedded inside the first layer. Each of the plurality of loose tubes includes one or more optical fibers and a gel.

In an embodiment of the present disclosure, the central strength member is made of fiber reinforced plastic. The central strength member has a diameter in a range of about 3.0 millimeters±0.1 millimeter.

In an embodiment of the present disclosure, the central strength member is up coated with a polyethylene material. The central strength member up coated with the polyethylene material has a diameter of about 4.2 millimeter.

In an embodiment of the present disclosure, the first layer has a thickness in a range of about 1.8 millimeter±0.3 millimeter.

In an embodiment of the present disclosure, the first jacket layer is made of one of polyethylene or polypropylene.

In an embodiment of the present disclosure, the first jacket layer has a thickness in a range of about 1.0 millimeter±0.2 millimeter.

In an embodiment of the present disclosure, the second jacket layer is made of nylon.

In an embodiment of the present disclosure, the second jacket layer has a thickness in a range of about 0.6 millimeter±0.3 millimeter.

In an embodiment of the present disclosure, the sensory cable has diameter in a range of about 11.0 millimeters±1.0 millimeter. In addition, the pulling strength of the sensory cable is about 2700 Newton. The crush resistance of the sensory cable is about 2200 Newton.

In another aspect, the present disclosure provides a sensory cable for direct buried application. The sensory cable includes a central strength member lying substantially along a longitudinal axis passing through a geometrical center of the sensory cable. In addition, the sensory cable includes a first layer surrounds the central strength member. The first layer is made of low smoke zero halogen. Further, the sensory cable includes a plurality of optical units. The plurality of optical units is embedded in the first layer. The plurality of optical units is positioned along a longitudinal length of the first layer. Furthermore, the sensory cable includes a second layer. The second layer surrounds the first layer. In addition, the second layer is made of a plurality of glass yarns. Moreover, the sensory cable includes a first jacket layer. The first jacket layer surrounds the second layer. Also, the sensory cable includes a second jacket layer. The second jacket layer surrounds the first jacket layer. The sensory cable is a high sensitive cable and enabled to be buried at a depth of up to 5 meters. Also, the plurality of optical units is one of a plurality of tight buffered fibers embedded inside the first layer or a plurality of loose tubes embedded inside the first layer.

In yet another aspect, the present disclosure provides a sensory cable for direct buried application. The sensory cable includes a central strength member lying substantially along a longitudinal axis passing through a geometrical center of the sensory cable. In addition, the sensory cable includes a first layer surrounds the central strength member. The first layer is made of low smoke zero halogen. Further, the sensory cable includes a plurality of optical units. The plurality of optical units is embedded in the first layer. The plurality of optical units is positioned along a longitudinal length of the first layer. Furthermore, the sensory cable includes a second layer. The second layer surrounds the first layer. In addition, the second layer is made of a plurality of glass yarns. Moreover, the sensory cable includes a first jacket layer. The first jacket layer surrounds the second layer. The first jacket layer is made of one of polyethylene or polypropylene. Also, the sensory cable includes a second jacket layer. The second jacket layer surrounds the first jacket layer. The second jacket layer is made of nylon. The sensory cable is a high sensitive cable and enabled to be buried at a depth of up to 5 meters. Also, the plurality of optical units is one of a plurality of tight buffered fibers embedded inside the first layer or a plurality of loose tubes embedded inside the first layer.

STATEMENT OF THE DISCLOSURE

In an aspect of the present disclosure, provides a sensory cable for direct buried application. The sensory cable includes a central strength member lying substantially along a longitudinal axis passing through a geometrical center of the sensory cable. In addition, the sensory cable includes a first layer surrounds the central strength member. The first layer is made of low smoke zero halogen. Further, the sensory cable includes a plurality of optical units. The plurality of optical units is embedded in the first layer. The plurality of optical units is positioned along a longitudinal length of the first layer. Furthermore, the sensory cable includes a second layer. The second layer surrounds the first layer. In addition, the second layer is made of a plurality of glass yarns. Moreover, the sensory cable includes a first jacket layer. The first jacket layer surrounds the second layer. The first jacket layer is made of one of polyethylene or polypropylene. Also, the sensory cable includes a second jacket layer. The second jacket layer surrounds the first jacket layer. The second jacket layer is made of nylon. The sensory cable is a high sensitive cable and enabled to be buried at a depth of up to 5 meters. Also, the plurality of optical units is one of a plurality of tight buffered fibers embedded inside the first layer or a plurality of loose tubes embedded inside the first layer.

BRIEF DESCRIPTION OF FIGURES

Figure 1A:
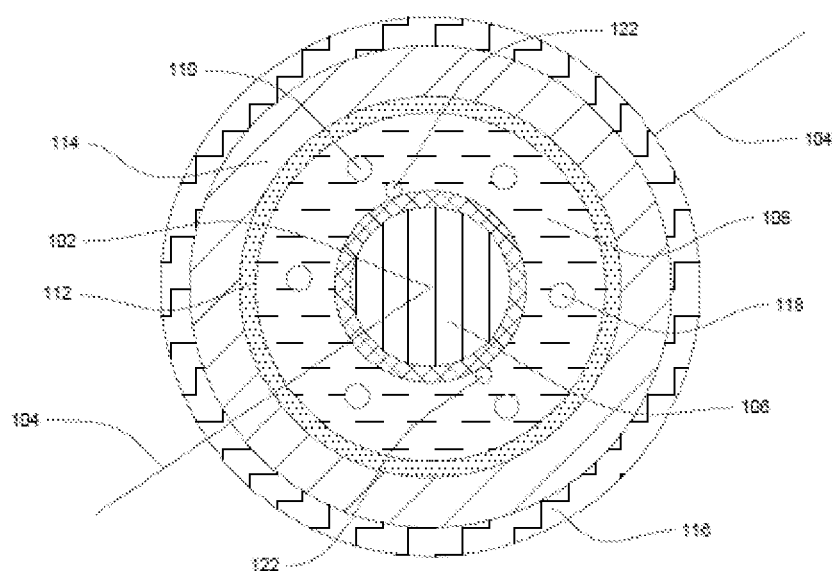
Figure 1B:
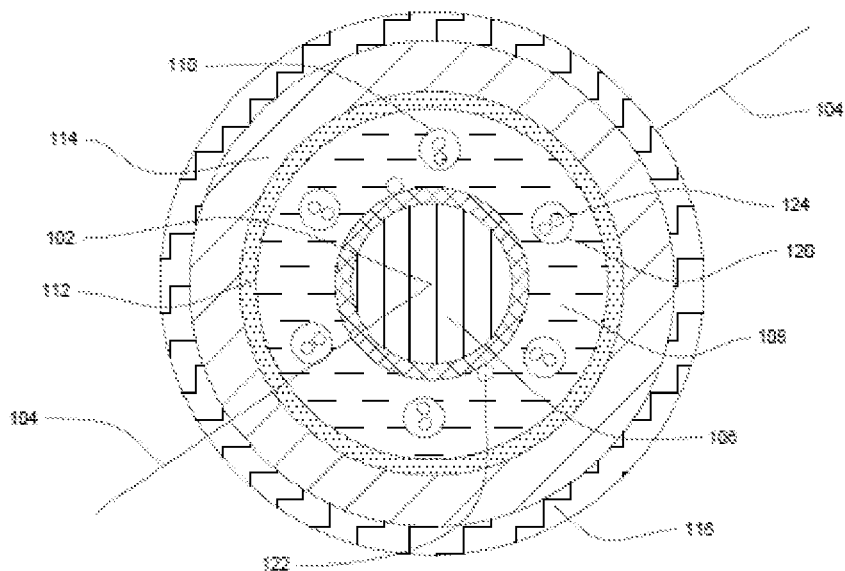

Having thus described the disclosure in general terms, reference will now be made to the accompanying figures, wherein:

FIG. 1A illustrates a cross sectional view of a sensory cable, in accordance with an embodiment of the present disclosure; and FIG. 1B illustrates a cross sectional view of the sensory cable, in accordance with another embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1A illustrates a cross sectional view of a sensory cable 100, in accordance with an embodiment of the present disclosure. In general, the sensory cable 100 is used to sense temperature, pressure, vibrations, displacements, rotations and the like. In addition, the sensory cable 100 detects any external cut or defect in the sensory cable 100. Moreover, an error detection signal is sent to control stations of the sensory cable 100 whenever any defect or external cut is detected in the sensory cable 100. In an embodiment of the present disclosure, the sensory cable 100 is used for direct buried applications. In general, direct buried applications include underground burial projects. The underground burial project includes but may not be limited to underground feeder and underground service entrance. Further, the sensory cable 100 has small diameter which makes the sensory cable 100 flexible, robust and easy to install.

The sensory cable 100 includes a central strength member 106, a first layer 108, a plurality of optical units 110, a second layer 112, a first jacket layer 114, a second jacket layer 116 and a plurality of ripcords 122.

The sensory cable 100 is defined along a longitudinal axis 104 passing through a geometrical center 102 of the sensory cable 100. In general, the longitudinal axis 104 of the sensory cable 100 is an imaginary axis along lengthwise direction of the sensory cable 100. The longitudinal axis 104 passes through the geometrical center 102 of the sensory cable 100. In general, the geometrical center 102 of the sensory cable 100 is a central point of the sensory cable 100. In other words, the geometrical center 102 of the sensory cable 100 is defined as a midpoint of diameter of the sensory cable 100.

The sensory cable 100 includes the central strength member 106. The central strength member 106 lies substantially along entire lengthwise direction of the longitudinal axis 104 of the sensory cable 100. In addition, the central strength member 106 provides physical strength to the sensory cable 100 and resists over bending of the sensory cable 100. Further, the central strength member 106 is used to bear cable installation load and also prevents the fibers from bearing the load directly. Furthermore, the central strength member 106 provides tensile strength to the sensory cable 100. In general, the tensile strength corresponds to a resistance shown by the sensory cable 100 against breaking when pressure is applied. In an embodiment of the present disclosure, the tensile strength of the sensory cable 100 is about 2700 Newton. In another embodiment of the present disclosure, the tensile strength of the sensory cable 100 may vary.

The central strength member 106 is characterized by a circular cross section. The circular cross section of the central strength member 106 runs along entire lengthwise direction of the longitudinal axis 104 of the sensory cable

100. In addition, the central strength member 106 is characterized by a diameter. In an embodiment of the present disclosure, the central strength member 106 has a diameter in a range of about 3.0 millimeters±0.1 millimeter. In another embodiment of the present disclosure, the range of the diameter of the central strength member 106 may vary. The central strength member 106 is made of fiber reinforced plastic. In general, the fiber reinforced plastic is a composite material having a polymer matrix reinforced with fibers. In an example, the fiber reinforced plastic includes glass fibers, carbon fibers, aramid fibers, basalt fibers and the like. In an embodiment of the present disclosure, the central strength member 106 is coated with a layer of polyethylene (PE). In general, the polyethylene material provides mechanical protection to the central strength member 106. In addition, polyethylene material is moisture resistant. Also, the polyethylene material is suitable for high pressure and temperature conditions. In an embodiment of the present disclosure, the central strength member 106 up coated with the polyethylene material has a diameter of about 4.2 millimeter. In another embodiment of the present disclosure, the central strength member 106 up coated with the polyethylene material may have any suitable diameter. In addition, the layer of the polyethylene material is characterized by a thickness. In an embodiment of the present disclosure, the thickness of the polyethylene material is about 1.0 millimeter±0.2 millimeter. In another embodiment of the present disclosure, the thickness of the polyethylene material may vary.

The sensory cable 100 includes the first layer 108. The first layer 108 surrounds the central strength member 106 concentrically along entire lengthwise direction of the sensory cable 100. The first layer 108 is an inner jacket layer. The first layer 108 is made of low smoke zero halogen material. In general, the low smoke zero halogen material is a flame retardant material. The low smoke halogen material is made of thermoplastic or thermoset compounds that emit low smoke and no halogen when exposed to high sources of heat. In addition, the low smoke zero halogen material reduces an amount of toxic and corrosive gas emitted during combustion. In an embodiment of the present disclosure, the first layer 108 is ultraviolet proof. In addition, the first layer 108 is characterized by a thickness. The thickness of the first layer 108 is in a range of about 1.8 millimeters±0.3 millimeter. In an embodiment of the present disclosure, the thickness of the first layer 108 may vary. Also, the first layer 108 is characterized by a diameter. In an embodiment of the present disclosure, the diameter of the first layer 108 is about 7 millimeters. In another embodiment of the present disclosure, the diameter of the first layer 108 may vary.

The sensory cable 100 includes the plurality of optical units 110. The plurality of optical units 110 is embedded in the first layer 108. The plurality of optical units 110 is positioned along a longitudinal length of the first layer 108 of the sensory cable 100. In addition, the plurality of optical units 110 is embedded in the first layer 108 along the entire lengthwise direction of the sensory cable 100. The plurality of optical units 110 is a plurality of tight buffered fibers 118 embedded inside the first layer 108 (as shown in FIG. 1A). In general, the plurality of tight buffered fibers 118 is robust and provides crush and bend resistance to the sensory cable 100. Further, the plurality of tight buffered fibers 118 is made of low smoke zero halogen. Each of the plurality of tight buffered fibers 118 is characterized by a diameter. In an embodiment of the present disclosure, each of the plurality tight buffered fibers 118 has the diameter in a range of about 0.9 millimeter±0.1 millimeter. In another embodiment of the present disclosure, the diameter of each of the plurality of tight buffered fibers 118 is of any suitable range. In an embodiment of the present disclosure, number of the plurality of tight buffered fibers 118 is 6. In another embodiment of the present disclosure, number of the plurality of tight buffered fibers 118 is 12. In yet another embodiment of the present disclosure, number of the plurality of tight buffered fibers 118 may vary. In an embodiment of the present disclosure, each of the plurality of tight buffered fibers 118 is colored fiber. In another embodiment of the present disclosure, each of the plurality of tight buffered fibers 118 is not a colored fiber. In an embodiment of the present disclosure, each of the plurality of tight buffered fibers 118 is of same color. In another embodiment of the present disclosure, each of the plurality of tight buffered fibers 118 is of different color.

The plurality of optical units 110 is a plurality of loose tubes 120 (as shown in FIG. 1B). The plurality of loose tubes 120 is embedded inside the first layer 108 of the sensory cable 100. In general, a loose tube is used to encapsulate fibers for providing mechanical isolation, protection from physical damage and fiber identification. In an embodiment of the present disclosure, the plurality of loose tubes 120 provides support and protection to each of one or more optical fibers 124 against crush, bend and stretch. In an embodiment of the present disclosure, number of plurality of loose tubes 120 is 6. In another embodiment of the present disclosure, number of the plurality of loose tubes 120 is 12. In yet another embodiment of the present disclosure, number of the plurality of loose tubes 120 may vary. In an embodiment of the present disclosure, each of the plurality of loose tubes 120 includes the one or more optical fibers 124 and a gel. In general, optical fiber is a fiber used for transmitting information as light pulses from one end to another. In an embodiment of the present disclosure, each of the one or more optical fibers 124 is a thin strand of glass capable of transmitting optical signals. Also, each of the one or more optical fibers 124 is configured to transmit large amounts of information over long distances with relatively low attenuation. Further, each of the one or more optical fibers 124 includes a core region and a cladding region. The core region is an inner part of each of the one or more optical fibers 124 and the cladding section is an outer part of each of the one or more optical fibers 124. In addition, the cladding region surrounds the core region. In general, the gel prevents ingression of water inside the one or more optical fibers 124. Also, the gel fills the entire part of each of the plurality of loose tubes 120 that is not occupied by the one or more optical fibers 124. In addition, the gel acts as a protective layer for the plurality of optical fibers 124.

The sensory cable 100 includes the second layer 112. The second layer 112 is circular in cross section. The second layer 112 surrounds the first layer 108 concentrically along entire lengthwise direction of the sensory cable 100. In an embodiment of the present disclosure, the second layer 112 is of any other suitable cross section. The second layer 112 is made of a plurality of glass yarns. In general, glass yarns provide rodent protection and crush resistance to the sensory cable 100. In an embodiment of the present disclosure, number of the plurality of glass yarns is 8. In another embodiment of the present disclosure, number of the plurality of glass yarns may vary. In an embodiment of the present disclosure, the second layer 112 has a linear mass density of 1200 Tex. In general, linear mass density is measure of a quantity of any characteristic value per unit of length.

The sensory cable 100 includes the first jacket layer 114. The first jacket layer 114 surrounds the second layer 112 concentrically along entire lengthwise direction of the sensory cable 100. In an embodiment of the present disclosure, the first jacket layer 114 is made of polyethylene. In general, polyethylene provides high abrasion and crack resistance to the sensory cable 100. In another embodiment of the present disclosure, the first jacket layer 114 is made of polypropylene. In general, polypropylene is highly resistant to high temperature. Also, polypropylene provides high flexibility to the sensory cable 100. In yet another embodiment of the present disclosure, the first jacket layer 114 is made of any suitable material. In an embodiment of the present disclosure, the first jacket layer 114 is an intermediate jacket layer of the sensory cable 100. The first jacket layer 114 is characterized by a thickness. In an embodiment of the present disclosure, the first jacket layer 114 has the thickness in a range of about 1.0 millimeter±0.2 millimeter. In another embodiment of the present disclosure, the thickness of the first jacket layer 114 may have any suitable range.

The sensory cable 100 includes the second jacket layer 116. The second jacket layer 116 surrounds the first jacket layer 114 concentrically along entire lengthwise direction of the sensory cable 100. In an embodiment of the present disclosure, the second jacket layer 116 is made of nylon. In general, nylon is a tough, light weight, elastic synthetic polymer with a protein like chemical structure. In addition, nylon provides termite protection to the sensory cable 100. Further, nylon is resistant to high temperature. Also, nylon is used to make the sensory cable 100 rugged. In another embodiment of the present disclosure, the second jacket layer 116 is made of any suitable material. In an embodiment of the present disclosure, the second jacket layer 116 is an outer jacket layer of the sensory cable 100. In addition, the second jacket layer 116 is characterized by a thickness. In an embodiment of the present disclosure, the second jacket layer 116 has the thickness in a range of about 0.6 millimeter±0.3 millimeter. In another embodiment of the present disclosure, the second jacket layer 116 has the thickness of any suitable range.

The sensory cable 100 includes the plurality of ripcords 122. In general, ripcords facilitate striping of outer layers of the sensory cable 100. In an embodiment of the present disclosure, number of the plurality of ripcords 122 is 2. In another embodiment of the present disclosure, number of the plurality of ripcords 122 may vary. In addition, the plurality of ripcords 122 is positioned diametrically opposite around the central strength member 106. In another embodiment of the present disclosure, the plurality of ripcords 122 is positioned at any suitable position. In an embodiment of the present disclosure, the plurality of ripcords 122 facilitates stripping of the first layer 108, the second layer 112, the first jacket layer 114 and the second jacket layer 116. In an embodiment of the present disclosure, the plurality of ripcords 122 is formed of polyester based yarns. In another embodiment of the present disclosure, the plurality of ripcords 122 is formed of any other suitable material.

The sensory cable 100 is a high sensitive cable. In addition, the sensory cable 100 can be buried at a depth of up to 5 meters. The sensory cable 100 remains sensitive to burial depth of up to 5 meters. Further, the sensory cable 100 is light in weight. The sensory cable 100 has a weight of about 128 kilogram per kilometer. The sensory cable 100 has small diameter. In an embodiment of the present disclosure, the sensory cable 100 has diameter in a range of about 11.0 millimeters±1.0 millimeter. In another embodiment of the present disclosure, the sensory cable 100 has diameter in any suitable range. Furthermore, the pulling strength of the sensory cable is about 2700 Newton. The pulling strength is defined as strength of a cable when pulled. Moreover, the sensory cable 100 has high crush resistance. The crush resistance of the sensory cable 100 is about 2200 Newton.

The sensory cable has numerous advantages over the prior art. The sensory cable is used for direct buried application at the depth of about 5 meters. In addition, the sensory cable has small diameter along with sensing applications. The sensory cable has high pulling strength and high crush resistance due to embedding of the plurality of tight buffered fibers in the first layer of the sensory cable. Also, the sensory cable is highly sensitive to external stresses.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. A sensory cable (100) for direct buried application comprising:
    a central strength member (106) lying substantially along a longitudinal axis (104) passing through a geometrical center (102) of the sensory cable;
    a first layer (108) surrounding the central strength member (106), wherein the first layer (108) is made of low smoke zero halogen;
    a plurality of optical units (110) embedded in the first layer (108), wherein
    the plurality of optical units (110) is positioned along a longitudinal length of the first layer (108), wherein the plurality of optical units (110) comprises:
        a plurality of loose tubes (120) embedded inside the first layer (108), wherein each of the plurality of loose tubes (120) comprises one or more optical fibers (124) and a gel;
    a second layer (112) surrounding the first layer (108) concentrically, wherein the second layer (112) is made of glass yarns;
    a first jacket layer (114) surrounding the second layer (112) concentrically; and
    a second jacket layer (116) surrounding the first jacket layer (114) concentrically.

2. The sensory cable (100) as claimed in claim 1, wherein the first layer (108) has a thickness in a range of 1.8 millimeter±0.3 millimeter, wherein the first jacket layer (114) is made of one of polyethylene or polypropylene, wherein the first jacket layer (114) has a thickness in a range of 1.0 millimeter±0.2 millimeter.

3. The sensory cable (100) as claimed in claim 1, wherein the second jacket layer (116) is made of nylon, wherein the second jacket layer (116) has a thickness in a range of 0.6 millimeter±0.3 millimeter.

4. The sensory cable (100) as claimed in claim 1, further comprising a plurality of ripcords (122), wherein the plurality of ripcords (122) is positioned diametrically opposite around the central strength member (106).

5. The sensory cable (100) as claimed in claim 1, wherein the central strength member (106) is made of fiber reinforced plastic, wherein the central strength member (106) has a diameter in a range of 3.0 millimeter±0.1 millimeter.

6. The sensory cable (100) as claimed in claim 1, wherein the central strength member (106) is up coated with polyethylene material, wherein the central strength member (106) up coated with polyethylene material has a diameter of 4.2 millimeter.

7. The sensory cable (100) as claimed in claim 1, wherein the sensory cable (100) has diameter in a range of 11.0 millimeters±1.0 millimeter, wherein the sensory cable (100) has a pulling strength of 2700 Newton, wherein the sensory cable (100) has a crush resistance of 2200 Newton.

8. The sensory cable (100) as claimed in claim 1, wherein the sensory cable (100) is highly sensitive to external stresses, wherein the sensory cable (100) has reduced diameter, flexible and robust and enabled to be buried at a depth of up to 5 meters.

9. A sensory cable (100) for direct buried application comprising:
- a central strength member (106) lying substantially along a longitudinal axis (104) passing through a geometrical center (102) of the sensory cable;
- a first layer (108) surrounding the central strength member (106), wherein the first layer (108) is made of low smoke zero halogen;
- a plurality of optical units (110) embedded in the first layer (108), wherein the plurality of optical units (110) is positioned along a longitudinal length of the first layer (108), wherein the plurality of optical units (110) comprises:
  - a plurality of loose tubes (120) embedded inside the first layer (108), wherein each of the plurality of loose tubes (120) comprises one or more optical fibers (124) and a gel,
- a second layer (112) surrounding the first layer (108) concentrically;
- a first jacket layer (114) surrounding the second layer (112) concentrically; and
- a second jacket layer (116) surrounding the first jacket layer (114) concentrically,
- wherein the sensory cable (100) is highly sensitive to external stresses, wherein the sensory cable (100) has reduced diameter, flexible, robust and is enabled to be buried at a depth of up to 5 meters.

10. The sensory cable (100) as claimed in claim 9, wherein the second layer (112) is made of plurality of glass yarns.

11. The sensory cable (100) as claimed in claim 9, wherein the first layer (108) has a thickness in a range of 1.8 millimeter±0.3 millimeter, wherein the first jacket layer (114) is made of one of polyethylene or polypropylene, wherein the first jacket layer (114) has a thickness in a range of 1.0 millimeter±0.2 millimeter.

12. The sensory cable (100) as claimed in claim 9, wherein the second jacket layer (116) is made of nylon, wherein the second jacket layer (116) has a thickness in a range of 0.6 millimeter±0.3 millimeter.

13. The sensory cable (100) as claimed in claim 9, wherein the sensory cable (100) has diameter in a range of 11.0 millimeters±1.0 millimeter, wherein the sensory cable (100) has a pulling strength of 2700 Newton, wherein the sensory cable (100) has a crush resistance of 2200 Newton.

\* \* \* \* \*